Figure 1:
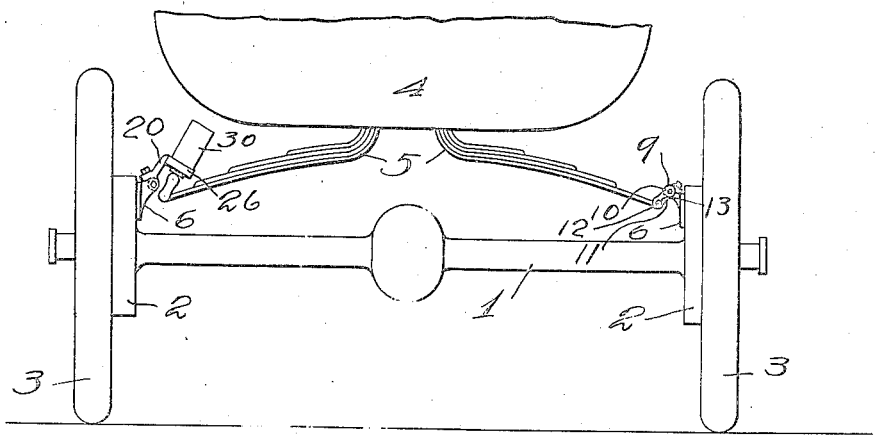
Figure 1:
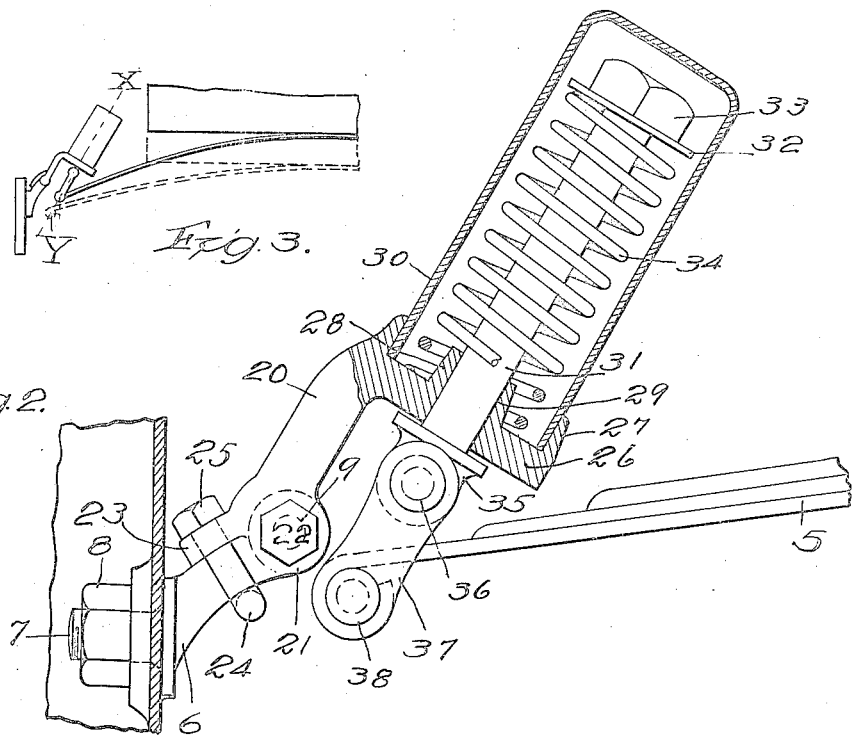

L. P. HALLADAY.
AUXILIARY SPRING FOR MOTOR VEHICLES.
APPLICATION FILED APR. 25, 1914.

1,131,370.

Patented Mar. 9, 1915.

Witnesses:

Inventor.
Lewis P. Halladay.
by Parker & Carter
his Attys.

UNITED STATES PATENT OFFICE.

LEWIS P. HALLADAY, OF STREATOR, ILLINOIS.

AUXILIARY SPRING FOR MOTOR-VEHICLES.

1,131,370.  Specification of Letters Patent.  Patented Mar. 9, 1915.

Application filed April 25, 1914. Serial No. 834,294.

*To all whom it may concern:*

Be it known that I, LEWIS P. HALLADAY, a citizen of the United States, residing at Streator, in the county of La Salle and State of Illinois, have invented a certain new and useful Improvement in Auxiliary Springs for Motor-Vehicles, of which the following is a specification.

My invention relates to shock absorbers for automobiles and road vehicles and is particularly applicable to such machines as have the cross spring suspension. The most satisfactory type is the absorber wherein an auxiliary spiral spring is provided for taking minor vibrations, and many forms have been produced with varying degrees of success. One defect in all these prior forms is that it is necessary to remove the spring brackets originally supplied with the car and furnish others. This is a great difficulty, no matter whether on the front or rear axle. If on the front axle, long bolts must be drawn out and the axle held steady while it is being done. If on the rear axle, the wheels must be pulled off in order to get out the holding nuts and remove the brackets. In my invention, therefore, I provide an auxiliary shock absorber which may be interposed between the end of the spring and the spring bracket as a substitute for the spring shackles without interfering with the spring brackets furnished with the car. Since the center of the cross spring is fixed and the support is from the two ends, it is obvious that when the car carries a load or strikes a bump and the main leaf springs are deflected, the distance between the opposed ends will vary, and in order to suitably support these opposed ends by auxiliary shock absorbers, a number of absorbers have been worked out wherein auxiliary spiral spring housings are provided. This takes care of this variation but is complicated, expensive and noisy and permits the car to side-swing to a very unsatisfactory extent. Others have used fixed spring supports with shackles, but this causes binding on one side or the other, and the free action of the auxiliary spring is largely interfered with. I have provided means, therefore, in my invention whereby the line along which the spiral spring works is always parallel with the line of pull so that tension on the spring is always central and there is no binding effect and no need for any locking spring support. I have done this by so proportioning the inclination of the spiral spring axis to the vertical that when a load is placed on the car the deflection of the leaf spring will cause it to lengthen a distance equal to the base of a right-angled triangle whose hypotenuse is equal to the travel of the part 36 during the expansion of the spiral spring. Thus at all times the link or shackle connecting the end of the tension rod supported by the spiral spring with the end of the cross spring will be in line with the tension rod. It is possible to mathematically figure out this exact inclination which will vary, of course, depending on the weight of the car and the relative sizes and resistance of the two springs, or it can be found by experiment. Preferably I find that the spiral spring ought to be inclined to the vertical about thirty-five degrees, but these figures, of course, would change if I used a different weight car or different springs either in the spiral or in the leaf.

My invention is illustrated diagrammatically in one form in the accompanying drawings, wherein—

Figure 1 shows a diagrammatic detail rear view of an automobile with a cross spring suspension such as is so familiar on the well known Ford automobile with my shock absorber in position; Fig. 2 is a detail on an enlarged scale of the shock absorber and end spring with parts in section; and Fig. 3 is a diagram showing the movement of the parts.

Like parts are indicated by like numerals throughout the several figures.

1 is the well known type of axle having on either end a fixed rigid brake drum 2, 2 and supported by the wheels 3, 3. 4 is the vehicle body and 5 the cross spring.

6, 6 is the usual type of spring bracket which comes on the car attached to the brake drum by a stud 7 and nut 8.

9 is the eyelet ordinarily used on the Ford car. It has passing through it the shackle pin 10 to hold the shackle 11 which shackle supports the spring pin 12 passing through the eye 13 in the end of the spring.

20 is a bracket having the two downwardly extending ears 21, 21 on either side of the eyelet 9 and held in position thereon by the pin or bolt 22.

23 is a lug projecting rearwardly from the bracket 20 overlying the spring bracket 6 and held in position thereagainst by the U-shaped yoke 24 and nuts 25.

26 is a spring containing platform mounted on the bracket 20 having two upwardly extending concentric flanges 27, 28 and apertured at 29. A spring housing 30 rests on the platform engaging and held in position by the flange 27.

31 is a guide and tension pin slidable in the aperture 29 and guided by the flange 28. At its upper end is a washer 32 held in position by the nut 33 resting on the spiral spring 34 which spring at its lower end rests on the platform 26.

35 is an eyelet on the lower end of the spring which carries the shackle pin 36 upon which is pivotally mounted the shackle 37.

38 is a spring pin carried or supported by the shackle 37 carrying the end of the spring 5.

In Fig. 3 is shown a diagram of the operation of my device. It will be noted in the full lines that the car is without load. When loaded either by passengers or by striking a bump the leaf spring is flexed into the dotted position and it descends compressing the spiral spring. It falls down to the point Y but besides moving down it is moved to the left equal to the elongation of the leaf spring, and the line X Y is a continuation of the axis of the spiral spring. It is, of course, true that in operation the car will strike bumps and jolts and have a tendency more or less to swing from side to side, but this will not materially interfere with the operation of my device, and while it may momentarily throw the line X Y out of parallelism with the axis of the spiral spring still this deflection will be negligible. In my arrangement, therefore, I provide a device wherein the arrangement of the parts is such that when a load is applied to the leaf spring that spring elongates in a line at right angles to the load line an amount such that it may be measured by the base of a right-angled triangle whose hypotenuse equals the elongation of the auxiliary spring and whose third side equals the vertical distance through which the force travels. This situation thus prevails for any load because, of course, the flexion of the two springs is substantially proportionate to the load and any slight variations may be neglected.

I have in the specification and claims used the term "axis" as applied to the auxiliary spring. It will be understood, of course, that the axis means the line along which the force of the auxiliary spring is applied and does not have any particular limited reference to the geometric form or arrangement of the spring. In other words, the axis has to do with and is limited by the operation of and not the shape of the auxiliary spring.

I claim:

1. In a motor vehicle a leaf spring having a free end, an auxiliary spring and a connection between it and the free end of the leaf spring, the axis of the auxiliary spring being fixed and inclined downwardly and outwardly toward the ends of the leaf spring.

2. In a motor vehicle a leaf spring having a free end, an auxiliary spiral spring and a connection between it and the free end of the leaf spring, the axis of the auxiliary spiral spring being fixed and inclined downwardly and outwardly toward the end of the leaf spring.

3. In a motor vehicle a leaf spring having a free end, an auxiliary spring and a connection between it and the free end of the leaf spring, the axis of the auxiliary spring being fixed and inclined downward and outwardly toward the end of the leaf spring, the inclination of said axis being such that no matter what load is applied to the leaf spring the line of connection between the free end thereof and the auxiliary spring is substantially in line with the axis of the auxiliary spring.

4. A spring suspension for motor vehicles and the like comprising a flat leaf spring relatively fixed in position at its center and free to move at its free end, a spiral spring and a support therefor, and a connection between the spiral spring and the leaf spring, the axis of the spiral spring being fixed and inclined to the vertical, the spiral spring being located above the leaf spring.

5. A support for auxiliary springs for motor vehicles and the like comprising a fixed platform, a bracket carrying said platform, a pair of apertured ears downwardly and outwardly projecting from the bracket beneath the platform, a plate projecting rearwardly from said ears, a U-shaped yoke passing through said plate and held in position thereon by suitable nuts and a pin upon which said ears are mounted.

6. The combination with the spring bracket of an automobile of a platform, an auxiliary bracket carrying said platform, ears projecting from said bracket, a pin passing through them and through the spring bracket and means for holding said bracket in fixed relation to the spring support.

7. The combination with the spring bracket of an automobile of a platform, an auxiliary bracket carrying said platform, ears projecting from said bracket, a pin passing through them and through the spring bracket and means for holding said bracket in fixed relation to the spring support, said means comprising a U-shaped loop surrounding the spring support and held in fixed relation to the bracket.

8. The combination with the spring bracket of an automobile of a platform and auxiliary bracket carrying said platform and supported on said spring bracket and means for securing the spring bracket and auxiliary bracket rigidly together, said means comprising a loop on the auxiliary bracket and surrounding the spring bracket and a transverse pin passing through both.

9. A spring suspension for motor vehicles and the like comprising a normally curved leaf spring relatively fixed at one point, a spiral spring fixed in position, a connection between the spiral spring and the end of the leaf spring, the axis of the spiral spring being in line with the path traveled by the end of the leaf spring.

10. A spring suspension for motor vehicles and the like comprising a normally curved leaf spring relatively fixed at one point, a spiral spring fixed in position, a connection between the spiral spring and the end of the leaf spring, the axis of the spiral spring being in line with the path traveled by the end of the leaf spring as it passes from the position assumed by it at no load to the position assumed by it at full load.

11. A spring suspension for motor vehicles and the like comprising a normally curved leaf spring relatively fixed at one point, a spiral spring fixed in position, a connection between the spiral spring and the end of the leaf spring, the axis of the spiral spring being in line with the path traveled by the end of the leaf spring, the spiral spring being located above the leaf spring.

12. A support for motor vehicles and the like, comprising a spring platform, a spring bracket, a spring platform support partially surrounding and engaging the spring bracket and means for holding the support and bracket together in fixed relation each to the other.

13. A support for motor vehicles and the like, comprising a spring platform, a spring bracket, a spring platform support partially surrounding and engaging the spring bracket, and means for holding the support and bracket together in fixed relation each to the other, said means comprising a member passing through the support and engaging the spring bracket.

In testimony whereof, I affix my signature in the presence of two witnesses this 15th day of April, 1914.

LEWIS P. HALLADAY.

Witnesses:
LOUIS NATER,
FRED C. BERTIAUX.